June 14, 1966 G. N. HOWATT ET AL 3,256,117
BATTERY CASING WITH IMPROVED SEAL AND VENT
Filed Sept. 25, 1963
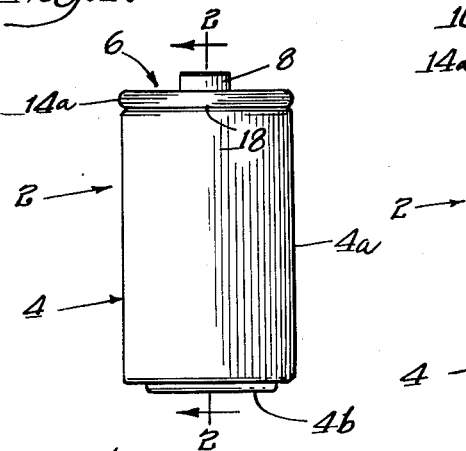
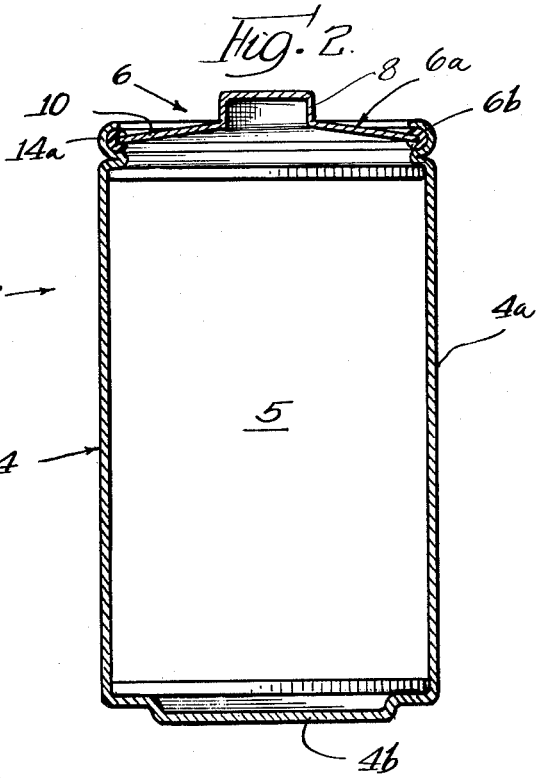
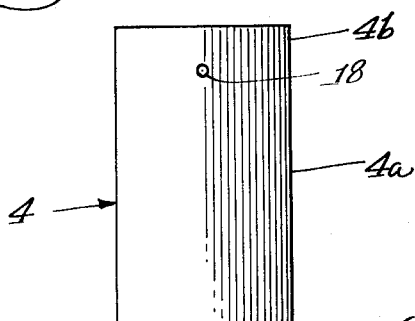
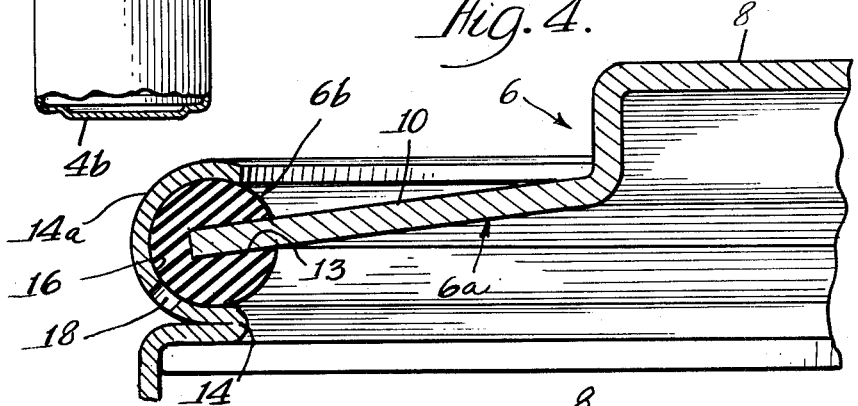
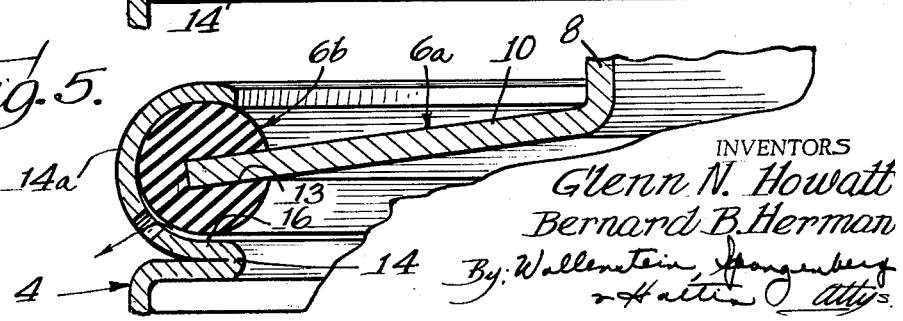
INVENTORS
Glenn N. Howatt
Bernard B. Herman
By Wallenstein, Spangenberg & Hattis
Attys.

United States Patent Office 3,256,117
Patented June 14, 1966

3,256,117
BATTERY CASING WITH IMPROVED SEAL AND VENT
Glenn N. Howatt, Metuchen, N.J., and Bernard B. Herman, New York, N.Y., assignors to Gulton Industries, Inc., Metuchen, N.J., a corporation of New Jersey
Filed Sept. 25, 1963, Ser. No. 311,425
3 Claims. (Cl. 136—178)

This invention relates to improved means for sealing and venting battery casings, and has its most important application in sealed batteries.

The means heretofore utilized for sealing and venting sealed battery casings have left much to be desired, particularly from the standpoint of simplicity of construction and reliability. It has been common, for example, to insert a sealing gasket between the cover and body portion of a battery casing to effect a seal therebetween. Unfortunately, the gaskets utilized had cold flow properties and leaks sometimes developed between the inner face of the casing cover and the gasket or between the casing body and the gasket. In certain types of dry cell batteries, such as nickel-cadmium batteries, excessive gas pressures due to unadsorbed oxygen and/or hydrogen gas generated therein sometimes developed which must be relieved. The techniques heretofore used for relieving the pressure in these batteries have been unsatisfactory from the standpoint of the cost or complexity of the venting means involved and/or due to the fact that the venting process damaged the cell casing as, for example, where a pressure responsive puncturing head was utilized which punctured the casing and thereby permanently exposed the cell interior to the atmosphere.

It is one of the objects of the present invention to provide an improved battery casing construction which minimizes the possibility of leakage between the casing parts.

It is another one of the objects of the present invention to provide an improved means for venting a battery casing as above described and which means, if desired, can be applied to existing battery constructions with a minimum of modification thereof. A related object of the invention is to provide a battery casing with a reliable vent construction therefor which is of such simple construction that it does not increase the cost of the battery casing. A still further related object of the invention is to provide a battery casing with a vent construction as described which does not in any way damage the casing during the venting process.

The present invention is best suited to a battery casing comprised of two casing parts positioned in confronting relation. For example, one of the casing parts may comprise an open ended casing body containing the battery plates and a separator for the plates impregnated with an electrolyte for providing a D.C. voltage across the plates, and a cover for the open end of the casing body. Both the casing body and the cover are preferably made of metal and are respectively connected to the oppositely polarized plates of the battery. A sealing ring made of a soft resilient, insulating material is mounted between the cover and the rim of the open end of the casing body to form a seal thereat and to insulate the cover from the casing body. In accordance with one aspect of the invention, the sealing ring forms a prefabricated integral part of one of the casing parts, most advantageously the cover in the form of the casing now being described. The sealing ring is preferably made of a sulphur-free neoprene, which material has substantially no cold flow properties, and is most advantageously molded around the periphery of the cover so that a permanent seal exists between the cover and the sealing ring.

The cover and sealing ring is placed within the open end of the casing body which is then deformed snugly inwardly around the outer end of the sealing ring to compress the same against a shoulder formed by the casing body at the inner end of the sealing ring. There is only one interface at which a leak can develop with such a construction, namely at the interface between the casing body and the sealing ring, and the possibility of such a leakage developing is minimized by making the sealing ring out of material which does not have any significant cold flow properties, such as sulfur-free neoprene. The resulting sealed casing represents a substantial improvement over sealed battery casings heretofore utilized and is of exceedingly simple and inexpensive construction so that no significant increase in the cost of the price of the battery is involved.

The sealed battery casing described above, where the sealing ring is sandwiched between a shoulder formed by the casing body at the inner side of the sealing ring and an inturned outer end of the casing body provides an exceedingly good environment for the application of the improved venting means of the present invention. It should be noted that with the integral cover and sealing ring construction described above an increase of pressure within the battery casing will result in the movement of the cover and the sealing ring as a unit outwardly. This will move the sealing ring away from the outwardly facing side of the shoulder provided by the casing body. In accordance with the present invention, a vent opening is placed in the walls of the casing body so as to intersect the interface between the sealing ring and the outwardly facing side of the shoulder referred to. The shoulder preferably has an outwardly curved shape and the vent opening is placed in this outwardly curved section so that the opening is uncovered when the sealing ring is moved substantially away from the inner end of the shoulder involved by excessive gas forces within the battery casing.

The present invention is applicable to many forms of battery casings including the elongated cylindrical sealed battery casings commonly used in flashlights and the so-called button-type batteries.

The above and other objects, advantages and features of the invention will become apparent upon making reference to the specification to follow, the claims and the drawings wherein:

FIG. 1 is a vertical elevation of an elongated cylindrical sealed battery constructed in accordance with the present invention;

FIG. 2 is an enlarged section through the casing of the battery in FIG. 1;

FIG. 3 is a vew of the open ended cylindrical blank from which the casing body of the battery in FIGS. 1 and 2 is made before the cover portion of the casing has been applied thereto;

FIG. 4 is a greatly enlarged fragmentary sectional view through the cover and the contiguous portion of the casing body under normal internal battery pressures showing the vent construction of the invention; and FIG. 5 is a view corresponding to FIG. 4 where excessive internal pressures are present within the battery so as to operate the venting means of the invention.

Referring now to FIG. 1 and 2, the battery casing there shown and generally indicated by reference numeral 2 comprises a casing body 4 having an elongated cylindrical side wall 4a and a closed bottom wall 4b. The casing body 4, which is preferably made of metal, is of a size to hold the normal components of a sealed battery including battery plates and a separator impregnated with an electrolyte for producing a voltage across the plates, which are generally indicated by reference numeral 5.

The negative plate is connected in any suitable well known way to the casing body 4.

The end of the casing body 4 opposite the bottom wall 4b is closed by a cover assembly generally indicated by reference numeral 6. As illustrated, this cover assembly includes a metal end wall member 6a having an upwardly extending terminal-forming portion 8 and a frusto-conical portion 10 extending outwardly and downwardly from the bottom of the terminal-forming portion 8. The cover assembly further includes a sealing ring 6b made of a soft resilient insulating material which does not have cold flow properties. Most advantageously, this sealing ring is molded around the perimeter of the frusto-conical portion 10 of the end wall member 6a so that a permanent seal exists at the interface between the end wall member 6a and the sealing ring 6b. The sealing ring 6b illustrated in the drawing has a circular cross section and an inwardly directed groove 13 which receives the end of the frusto-conical portion 10 of the end wall member 6a. Sulphur-free neoprene is an especially satisfactory material for the ring 6b.

The cover assembly is securely mounted in place in the upper end of the casing body 4 in the manner best shown in FIGS. 4 and 5. The upper portion of the casing body has an inwardly extending fold 14 forming an outwardly and upwardly curved shoulder 16 or seat 16 for the sealing ring 6b. The metal of the casing body then curves inwardly to form a cover securing portion 14a. The cover securing portion 14a of the casing body bends around the sealing ring 6b to compress the ring against the seat. A normally gas-tight seal is thus formed at the interface between the sealing ring 6b and the casing body seat or shoulder 16. Since the sealing ring 6b has substantially no cold flow characteristics, this seal will be maintained indefinitely under normal operating conditions of the battery. Also, because of the integral construction of the sealing ring 6b and the end wall member 6a, no leakage occurs between these two members, and the assembly of the battery casing is simplified by the reduction of the number of separate parts making up the casing assembly.

Where abnormal pressures build up within the battery casing due, for example, to the build up of oxygen or hydrogen gases within the battery casing, the pressure will cause the end wall member 10 to move upwardly. This upward movement of the end wall member 10 will lift the sealing ring 6b from the seat 16 and, at a particular pressure, will cause the ring 6b to separate first from the bottommost portion of the seat 16, and then, as the pressure is progressively raised, from progressively higher portions of the seat 16.

In accordance with another aspect of the present invention, advantage is taken of this progressive movement of the sealing ring 6b as pressure progressively builds up from a normal value within the casing to provide an exceedingly simple and effective vent for the battery casing. To this end, a hole 18 is formed in the seat-forming portion of the casing body where the hole will intersect a point of the upwardly and outwardly curving seat 16 which will be uncovered at the limiting pressure for which the vent is designed to relieve the gas pressure within the casing body. In the example illustrated, the vent hole 18 is located approximately at the 45° point of the lower portion of the circle along which the seat 16 extends. FIG. 5 illustrates the point at which the sealing ring 6b separates from the seat 16 to expose the vent hole 18. When the gas pressure is relieved, the sealing ring automatically drops back into place against the lower portion of the seat 16 to re-establish the seal.

The construction of the sealed end of the casing 2 as described enables the casing body to be readily assembled. As shown in FIG. 3, the casing body 4 prior to assembly of the casing has an undeformed open upper end 4b. The vent hole 18 is preferably placed in the blank before it is assembled with the cover assembly 6. After the plate and separator assembly 5 is placed in the casing body so that the negative plate contacts or is connected to the casing body in the usual way, the cover assembly 6 is positioned within the upper portion of the casing body blank whereby the positive plate contacts or is connected to the end wall member 6a in the usual way, and the fold 14 and the cover securing portion 14a of the casing body is formed by suitable metal forming machinery, to complete the casing assembly.

It should be understood that numerous modifications may be made in the form of the invention illustrated without deviating from the broader aspects of the invention. For example, as previously indicated, some aspects of the invention are applicable to other types of battery casings than the elongated cylindrical casing described, such as button-type battery casings utilizing flat or round sealing gaskets.

What we claim as new and desire to protect by Letters Patent of the United States is:

1. In a battery including a first casing part having side walls and an end wall, battery plates and an electrolyte for providing a D.C. voltage across the plates, the improvement comprising: a second casing part in confronting relation to said first casing part and forming therewith an enclosure for said battery plates and electrolyte, and resilient sealing means positioned around the peripheral portion of said second casing part, said sealing means having a portion extending to the outer axially facing side of said second casing part wherein outward movement of the second casing part will move the sealing ring outward with it, said first casing part having an inwardly extending portion forming an outwardly axially facing seat for the inner axially facing side of said sealing means, said second casing part having a portion extending to an outer axially facing portion of said sealing means where it bears against the sealing means to press the same against said seat to form a gas tight seal for the battery, and said first casing part having a vent passage communicating between the outwardly axially facing surface of said sealing means seat and the exterior of the battery and which, under normal interior pressures of the battery, is sealed by the sealing means and, under abnormally high interior gas pressures which moves said second casing part and the sealing means outwardly, is unsealed to permit escape of gas through the resulting clearance between the sealing means and the seat therefor.

2. A battery including a housing containing battery plates and an electrolyte for providing a D.C. voltage across the plates, said housing comprising a pair of confronting housing members at least one of which has side walls and an end wall at one end thereof, and the other housing part having an end wall, a sealing ring extending around the peripheral portion of one of said end walls to the outer axially facing side thereof wherein outward movement of said one end wall will move the sealing ring outward with it, the housing member with the other end wall having a seat for the inner axially facing side of said sealing ring, means on the latter housing member bearing on an outer axially facing portion of said sealing ring to press the same against said seat to form a gas-tight seal for the battery, and a vent passage communicating between the outwardly axially facing surface of said sealing ring seat to the exterior of the battery which, under normal interior pressures of the battery, is sealed by the sealing ring and, under abnormally high interior gas pressures, is unsealed to permit escape of gas through the resulting clearance between the sealing ring and the seat therefor.

3. In a battery including an open-end housing body having side walls and an end wall at one end thereof, the housing body including battery plates and an electrolyte for providing a D.C. voltage across the plates, the improvement comprising: a closure assembly for the battery extending across the end of said housing body side walls, the closure assembly comprising a second end wall and sealing ring extending around the peripheral portion of said second end wall to the outer axially facing side thereof wherein outward movement of the end wall will move the sealing ring outward with it, said housing body side walls having an inwardly extending fold spaced from the outer end of the side walls which fold forms a seat for the inner axially facing side of said sealing ring, said outer end of said housing body side walls bending inwardly to bear on an outer axially facing portion of said sealing ring to press the same against said seat to form a gas tight seal for the battery, and a vent hole formed in the housing side walls immediately above said fold therein to form a vent passage communicating between the outwardly axially facing surface of said sealing ring seat to the exterior of the battery which, under normal interior pressures of the battery, is sealed by the sealing ring and, under abnormally high interior gas pressures which moves said second casing part and the sealing ring outwardly, is unsealed to permit escape of gas through the resulting clearance between the sealing ring and the seat therefor.

References Cited by the Examiner
UNITED STATES PATENTS

| 2,174,437 | 9/1939 | Collins | 220—44 |
| 2,262,836 | 11/1941 | Deibel | 136—133 |
| 2,457,810 | 1/1949 | Ellis | 136—133 |
| 3,081,367 | 3/1963 | Field et al. | 136—133 |

ALLEN B. CURTIS, *Primary Examiner.*

WINSTON A. DOUGLAS, *Examiner.*

D. L. WALTON, *Assistant Examiner.*